United States Patent
Wang et al.

(10) Patent No.: US 7,041,734 B2
(45) Date of Patent: May 9, 2006

(54) SOFT GEL COMPOSITION OF LOW PERMEABILITY

(75) Inventors: Xiaorong Wang, Hudson, OH (US); Victor J. Foltz, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/855,998

(22) Filed: May 28, 2004

(65) Prior Publication Data

US 2005/0267259 A1    Dec. 1, 2005

(51) Int. Cl.
*C08L 51/08* (2006.01)
(52) U.S. Cl. .......................................... 525/69; 525/71
(58) Field of Classification Search ................. 525/69, 525/71
See application file for complete search history.

(56) References Cited

U.S. PATENT DOCUMENTS

| | | | |
|---|---|---|---|
| 4,900,770 A | 2/1990 | Tomita et al. | 524/274 |
| 5,037,885 A | 8/1991 | Mori et al. | 525/92 |
| 5,618,882 A | 4/1997 | Hammond et al. | 525/92 |
| 5,910,530 A | 6/1999 | Wang et al. | 524/534 |
| 5,925,707 A | 7/1999 | Shafer et al. | 524/490 |
| 5,994,468 A | 11/1999 | Wang et al. | 525/178 |
| 6,300,418 B1 | 10/2001 | Brozozowski et al. | 525/191 |
| 2003/0100662 A1 | 5/2003 | Wang et al. | 524/504 |
| 2005/0148727 A1* | 7/2005 | Ajbani et al. | 525/63 |

OTHER PUBLICATIONS

"Modification of a Thermoplastic Elastomer Gel through the Addition of an Endblock-Selective Homopolymer" by Jackson et al., *Journal of Polymer Science: Part B: Polymer Physics*, vol. 37, 1863-1872 (1999).

"Long-Range Order in Physical Networks of Gel-Forming Triblock Copolymer Soutions" by Kleppinger et al., *Journal of Polymer Science: Part B: Polymer Physics*, vol. 37, 1833-1840 (1999).

Final Office Action of U.S. Appl. No. 10/002,473 dated Mar. 11, 2004.

Notice of Abandonment of U.S. Appl. No. 10/002,473 dated Nov. 1, 2004.

Claims of U.S. Appl. No. 10/002,473.

* cited by examiner

*Primary Examiner*—Jeffrey Mullis
(74) *Attorney, Agent, or Firm*—Arthur Reginelli; Meredith E. Palmer

(57) ABSTRACT

A gel composition that is the combination of or reaction product of ingredients comprising a thermoplastic elastomer copolymer comprising polystyrene-b-poly(ethylene-ethylene/propylene)-b-polystyrene, a nylon-grafted elastomer, and an extender.

19 Claims, No Drawings

SOFT GEL COMPOSITION OF LOW PERMEABILITY

TECHNICAL FIELD

This invention relates to thermoreversible soft gel compositions.

BACKGROUND OF THE INVENTION

Many electronic devices such as computers, compact disc players, DVD players, and the like include a drive assembly or housing wherein a disk is coaxially mounted about a spindle apparatus that rotates at speeds in excess of several thousand revolutions per minute (RPM) and a head that writes and reads information to and from the rotating storage disk. The head usually is disposed at the end of an actuator arm and positioned above the storage disk. The actuator arm can move relative to the storage disk. In many instances, the drive assembly is mounted on a disk base (support plate) and sealed with a cover plate to form a housing that protects the assembly from contamination.

Serious damage including loss of valuable information, can result from migration of gaseous and particulate contaminants into the drive assembly housing. To prevent or substantially reduce introduction of these contaminants into the drive housing, a flexible sealing gasket is disposed between the mounting plate and the cover plate. Sealing gaskets typically are prepared by punching annular disks from a sheet of cured elastomer.

These sealing gaskets typically are adhered or mechanically attached, e.g., affixed with screws, to the support plate. Not only do these means of attachment present long-term problems, they present many manufacturing issues. To begin with, the pre-formed gasket must be properly seated into the assembly to ensure a proper seal. And, once seated, the mechanical fasteners must be affixed into place. Or, where an adhesive is employed, the gasket must be treated with the adhesive prior to placement in the assembly or the adhesive must be placed directly in the assembly. These manufacturing steps not only add time and cost to the manufacturing process, but they also present quality assurance issues.

An alternative solution includes the use of an adhesive material that can be directly applied to the support plate or cover plate prior to or after assembly of the housing. For example, a material can be extruded onto the cover plate prior to affixing the cover plate to the support. A first requirement of this material is that is must adhere to the cover plate. The cover plate is typically made of metal or other polar materials and therefore the number of materials that can be employed is necessarily limited. Materials such as polyamides (e.g., nylon 12) are known to adhere to polar surfaces. Unfortunately, many of these materials are thermoplastic in nature and tend to be rather hard. Therefore, their ability to act as gaskets is rather limited.

Softer compositions that include nylon are known. For example, U.S. Pat. No. 6,300,418 teaches compositions that include a styrene-based thermoplastic elastomer such as styrene-butadiene-styrene, styrene-ethylene/butylene-styrene, or styrene-isoprene-styrene and an adhesion promoter such as the reaction product between a functionalized thermoplastic rubber and a polyamide. Unfortunately, the service temperature of these blends is rather low and therefore they are inferior in many applications including their use in the formation of gaskets for electronic devices. Indeed, electronic devices can be exposed to temperatures in excess of 70° C., and even potentially 70° C., which will cause thermoplastic elastomer copolymers such as styrene-butadiene-styrene or styrene-isoprene-styrene to flow. As a result, the gaskets will deleteriously deform.

SUMMARY OF THE INVENTION

The present invention provides a gel composition that is the combination of or reaction product of ingredients comprising a thermoplastic elastomer copolymer comprising polystyrene-b-poly(ethylene-ethylene/propylene)-b-polystyrene, a nylon-grafted elastomer, and an extender.

The present invention further provides a gasket formed by melt extruding a composition that is the combination or reaction product of ingredients comprising a thermoplastic elastomer copolymer comprising polystyrene-b-poly(ethylene-ethylene/propylene)-b-polystyrene a nylon-grafted elastomer, and an extender.

The present invention also provides a disk drive assembly for computers comprising a gasket formed by melt extruding a composition that is the combination or reaction product of ingredients comprising a thermoplastic elastomer copolymer, a nylon-grafted elastomer, and an extender.

The soft gel compositions of this invention are advantageously thermoreversible, and therefore they can be applied by hot injection molding or melt extruding. Also, these compositions can be recycled. Further, the unique combination of materials employed within the composition provides for a material that has excellent adhesive characteristics, especially to metals and plastics, and very low gas permeability. Accordingly, gaskets made from the composition of this invention can be directly applied to a metal or plastic surface via heat molding. The gaskets advantageously greatly reduce the intrusion of gases and airborne contaminants into devices such as disk drive assemblies. Moreover, gaskets made with the soft gel compositions of this invention exhibit improved heat stability resulting from the unique combination of the constituents of the composition. As a result, gaskets prepared from the soft gel compositions can be used in environments where the gaskets are exposed to temperatures in excess of 50° C., advantageously in excess of 60° C., more advantageously in excess of 70° C., and even more advantageously temperatures in excess of 80° C.

DETAILED DESCRIPTION OF ILLUSTRATIVE EMBODIMENTS

Gel compositions that include a blend of a nylon-grafted elastomer, at least one thermoplastic elastomer copolymer, and an extender are soft, thermoreversible gels. More specifically, gel compositions that include a blend of a nylon-grafted elastomer, a hydrogenated block copolymer of styrene, ethylene and propylene, and an extender exhibit low permeability, good adhesion to metal and plastic substrates, and can be utilized in hot injection molding applications. These gel compositions can be provided simply by mixing together the three components.

The soft gel compositions preferably have a Shore A hardness of less than about 25. They exhibit excellent thermostability, as evidenced by a compression set after 22 hours at 100° C. of less than about 60%, advantageously less than 40, more advantageously less than 50%.

The soft gel compositions include about 5 to about 80 parts by weight (pbw) nylon-grafted elastomer and about 5 to about 1,000 pbw extender, preferably about 20 to about 80 pbw nylon-grafted elastomer and about 10 to about 800 pbw extender, and more preferably about 20 to about 40 pbw nylon-grafted elastomer and about 25 to about 600 pbw extender, per 100 pbw thermoplastic elastomer copolymer.

The nylon-grafted elastomer is a copolymer of a nylon polymer and an elastomer, where the nylon polymer is preferably grafted to the elastomer.

The nylon grafted segments preferably have a weight average molecular weight ($M_w$) from about 500 to about 300,000, or higher, and more preferably from about 1,000 to about 50,000, as measured by gel permeation chromatography (GPC) with polystyrene standards.

Any conventional nylon compound may be employed to prepare the nylon-grafted elastomer. Nylons are thermoplastic polyamide materials having at least one amide group. Nylons advantageously provide the nylon-grafted elastomer with good mechanical strength, low permeability, and self-adhesive properties. The nylon may vary from being substantially amorphous to being completely crystalline, which is from about 10–100% crystallinity, as measured by differential scanning calorimetry (DSC). Most typically, the nylon will be substantially crystalline, for example, greater than about 90% crystallinity.

Non-limiting examples of suitable nylons include, but are not limited to, polypyrrolidone (nylon 4), polycaprolactam (nylon-6), polyheptolactam (nylon-7), polycapryllactam (nylon 8), polynonanolactam (nylon-9), polyundecanolactum (nylon-11), polylauryllactam (nylon 12), polyhexamethylene adipamide (nylon-6,6), polyhexamethylene azelamide (nylon-6,9), polyhexamethylene sebacamide (nylon-6, 10), polyamide of hexamethylenediamine and n-dodecanedioic acid (nylon-6,12), polyamide of dodecamethylenediamine and n-dodecanedioic acid (nylon-12,12), polyhexamethylene isophthalamide (nylon-6, IP) and polyhexamethyleneterephthalamide (nylon-6, TP). Nylon copolymers may also be use, for example, as nylon-6-nylon-66 copolymer, nylon-6-nylon-12 copolymer and the like. Preferably, the nylon polymer that is grafted to the elastomer is nylon-12. Nylon-12 is commercially available from Aldrich Chemical Company (Milwaukee, Wis.).

The polymer to which the nylon segment is grafted is an elastomer or rubbery polymer that, prior to grafting with nylon, has a $M_w$ from about 500 to about 300,00, preferably from about 1,000 to about 50,000 and, more preferably, from about 5,000 to about 10,000.

In order to graft the nylon to the elastomer, the elastomer preferably has a functional group that will to react with nylon to form a nylon-grafted elastomer. The elastomer may be referred to as a functionalized elastomer. Preferably, this reaction occurs via the amine or amide substituent of the nylon. Without being bound to any particular theory, it is believed that the amine or amide groups of the nylon react to form covalent bonds with the functional groups of the elastomeric polymer.

The functional groups on the elastomer may include terminal functional groups, pendant functional groups, or both. Exemplary functional groups include anhydride groups or carboxylic acid groups, with anhydride groups being preferred. The elastomers that contain terminal or pendant functional groups may be obtained by grafting functional groups to a polymeric chain or by preparing a copolymer by using at least one monomer that will yield the desired functional group.

In one embodiment, the functionalized elastomer can be obtained by polymerizing unsaturated carboxylic acids or unsaturated anhydrides from a graft point on an elastomer. Non-limiting examples of elastomers from which this grafting reaction may take place include polybutadiene, poly(styrene-co-butadiene), polyisoprene, poly(styrene-co-butadiene-co-isoprene), poly(styrene-co-isoprene), copolymers of ethylene and an α-olefin and terpolymers of ethylene, an α-olefin, and diene monomers. Useful α-olefins include propylene, butene, pentene, hexene, etc. Copolymers of ethylene and an α-olefin are the preferred elastomeric polymers from which to graft unsaturated carboxylic acids or unsaturated anhydrides to form a functionalized elastomer.

Non-limiting examples of unsaturated carboxylic acids that can undergo polymerization and graft to an elastomer include citraconic acid, cinnamic acid, methacrylic acid, itaconic acid, and acrylic acid. Examples of unsaturated anhydrides that can undergo polymerization and graft to an elastomer include maleic anhydride, citraconic anhydride, and itaconic anhydride. The preferred unsaturated anhydride is maleic anhydride.

Free radical polymerization is the preferred reaction for grafting these monomers to an elastomer. Preferably, this technique employs an initiator such as a thermo-decomposition initiator. Examples of these initiators include, but are not limited to, di-sec-butyl peroxydicarbonate, t-amyl peroxy pivalate, 2,5-dimethyl-2,5-di-(2-ethylhexanoyl-peroxy) hexane, t-amylperoxy-2-ethylhexanoate, t-butyl-2-ethylhexanoate, 2,2-azo-bis-(2-methyl propionitrile), azo-bis-isobutyronitrile (AIBN) and the like. This grafting reaction preferably takes place in an inert solvent such as a hydrocarbon solvent.

Where the functional group is grafted to an elastomeric polymer to form the functionalized elastomer, the resulting grafted copolymer may contain from about 0.01 to about 10 percent by weight, preferably from about 0.05 to about 5 percent by weight, and even more preferably from about 0.1 to about 2 percent by weight of the grafted functional groups.

Alternatively, the functionalized elastomer can be obtained by copolymerizing unsaturated carboxylic acid monomers or unsaturated anhydride monomers with diene, ethylene, α-olefin, or other monomers that will provide a rubbery polymer. Examples of unsaturated carboxylic acids and unsaturated anhydrides are provided above. Examples of diene monomers that will yield a rubbery polymer include, but are not limited to, 1,3-butadiene and isoprene. Other monomers that may be copolymerized with these diene monomers include α-olefins and vinyl aromatic monomers such as styrene. This copolymerization technique is well known, and it typically takes place in an emulsion polymerization with the use of a radical source such as a peroxide redox system.

In one embodiment, the elastomer is maleated ethylene-propylene rubber (EPR). The graft copolymer can be prepared by either copolymerization of the constituent monomers or by the grafting of a maleate function onto an existing EPR. When the maleate is grafted to the EPR, this grafting can take place in the solid state or within a solution that is preferably homogeneous. The solid state reaction is preferably carried out in an extruder at elevated temperatures that may reach as high as 350° C.

The EPR is preferably substantially amorphous, which refers to a degree of crystallinity less than about 25% as measured by differential scanning calorimetry (DSC), more preferably less than about 15%, and even more preferably less than about 10%.

The amount of maleic anhydride employed in forming the maleated EPR may range from about 0.01 to about 10% by weight based on total weight of maleic anhydride and EPR with a preferred amount being from 0.05 to 5% by weight.

The maleated EPR will generally have a $M_w$ from about 5,000 to about 1,000,000 or higher, more typically from about 10,000 to 500,000, and even more typically from about 15,000 to 350,000.

The grafting of the nylon polymer to the elastomer preferably occurs in the solid state. In other words, a functionalized elastomer and a nylon polymer are blended, preferably melt blended, in order to effect a reaction between the nylon and the functional group of the elastomer. Performance of solid-state polymeric reactions is well known in the art. For example, it is common to employ a single or multiple-screw extruder to effect this reaction. The proportion ratio of reactants (i.e., the functionalized elastomer and the nylon polymer) can be varied based on the desired results. Also, the degree of functionalization and the type of nylon employed will impact the ratio of ingredients. Those skilled, in the art will be able to readily determine appropriate reaction quantities without undue calculation or experimentation. In one embodiment, the weight ratio of the nylon polymer to the elastomer is from about 0.5:1 to about 4:1, more preferably from about 1:1 to about 3:1 and more preferably from about 1.5:1 to about 2.5:1.

The thermoplastic elastomer copolymer is preferably a block copolymer that includes at least one rubbery block and at least one thermoplastic block. Preferably, the copolymer is a triblock that includes at least two thermoplastic blocks attached to opposite ends of a rubber block. The molecular structure of the copolymers may be straight-chain, branched-chained, radial, or types and combinations thereof.

These copolymers preferably have a number average molecular weight (Mn) of from about 100,000 to about 1,000,000, preferably from about 125,000 to about 800,000, and more preferably from about 150,000 to about 500,000. The molecular weight distribution ratio ($M_w/M_n$) is preferably 10 or less.

Useful thermoplastic elastomer copolymers include, but are not limited to, styrene/butadiene rubber (SBR), styrene/isoprene rubber (SIR), styrene/isoprene/butadiene rubber (SIBR), hydrogenated styrene-butadiene block copolymer (SEB), styrene-isoprene block copolymer (SI), hydrogenated styrene-isoprene block copolymer (SEP), also known as polystyrene-b-poly(ethylene/propylene), hydrogenated styrene-isoprene-styrene block copolymer (SEPS), also known as polystyrene-b-poly(ethylene/propylene)-b-polystyrene, styrene-ethylene/butylene-ethylene block copolymer (SEBE), styrene-ethylene-styrene block copolymer (SES), hydrogenated polystyrene-isoprene/butadiene-styrene block copolymer (SEEPS), also known as polystyrene-b-poly(ethylene-ethylene/propylene)-b-polystyrene, ethylene-ethylene/butylene block copolymer (EEB), ethylene-ethylene/butylene/styrene block copolymer (hydrogenated BR-SBR block copolymer), ethylene-ethylene/butylene-ethylene block copolymer (EEBE) and mixtures thereof. Preferred copolymers include hydrogenated block copolymers of styrene, ethylene, and propylene. More preferred copolymers include SEEPS copolymers. The preferred copolymers, including SEEPS, are commercially available under the tradename SEPTON (Kuraray; New York, N.Y.); these SEEPS copolymers are available in a variety of grades under the designations S4033, S4055, and S4077. S4077 is preferred.

Useful extenders include oils or low molecular weight organic compounds. Without intending to be bound to any particular theory, the extender is believed to interact with the thermoplastic elastomer copolymer and increase the distance between the thermoplastic blocks or domains thereof, thereby forming an extended or soft gel composition.

Suitable oils include naphthenic, aromatic, paraffinic, phthalic, and silicone oils. A preferred extender oil is paraffinic oil. Preferably, the extender oils have a $M_w$ from about 100 to about 10,000.

Examples of low molecular weight organic compounds include organic materials having a $M_n$ of less than 20,000, preferably less than 10,000, and most preferably less than 5,000. Suitable low molecular weight compounds include softening agents, plasticizers, oligomers, liquid polymers and copolymers, lubricants, and low molecular weight petroleum products. Other appropriate low-molecular organic materials include latexes, emulsions, liquid crystals, bituminous compositions, and phosphazenes. One or more of these materials may be used as extenders.

Exemplary softening agents include aromatic, naphthenic, and paraffinic softening agents, which are commonly used in rubbers or resins.

Exemplary plasticizers include phthalic esters, mixed phthalic esters, aliphatic dibasic acid esters, glycol esters, fatty acid esters, phosphoric esters, stearic esters, epoxy esters, phthalate esters, adipate esters, sebacate esters, phosphate esters, polyether and polyester plasticizers, which are commonly used with nitrile rubber.

Exemplary tackifiers include coumarone resins, coumarone-indene resins, terpene phenol resins, petroleum hydrocarbons, and rosin derivatives.

Exemplary oligomers include crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins.

Exemplary lubricants include hydrocarbon lubricants such as paraffins and waxes, fatty acid lubricants such as higher fatty acids and hydroxy-fatty acids, fatty acid amide lubricants such as fatty acid amides and alkylene-bis-fatty acid amides, ester lubricants such as fatty acid-lower alcohol esters, fatty acid-polyhydric alcohol esters and fatty acid-polyglycol esters, alcoholic lubricants such as fatty alcohols, polyhydric alcohols, polyglycols and polyglycerols, metallic soaps, and mixed lubricants.

Exemplary petroleum products include synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

The gel composition may also include other additives such as, for example, fillers, shrinkage inhibiting agents, and pigments.

Suitable fillers include both organic and inorganic fillers. Preferred organic fillers include carbon black. Preferred inorganic fillers include silica, alumina, aluminum hydroxide, magnesium hydroxide, and various clays. Fillers are typically employed in amount from about 5 to about 30 pbw per 100 pbw of thermoplastic elastomer.

Useful shrinkage inhibiting agents include crystalline polyolefins. Suitable crystalline polyolefins include polyethylene and polypropylene. Crystalline polyolefins are typically used in amount from about 5 to about 20 pbw per 100 pbw of thermoplastic elastomer copolymer.

The soft gel compositions are formed by combining or mixing the nylon-grafted elastomer, the thermoplastic elastomer, and extender. While the soft gel composition is believed to result from the mere combination of these three components, the degree of interaction or reaction between the various components is not known with any great degree of certainty. The term soft gel composition, therefore, is intended to encompass a simple mixture or blend of the three components, a complex of the three components that results from physical or chemical forces of attraction, a chemical reaction products of the three components, or a combination of the foregoing.

Solid state mixing of the ingredients may be performed in an internal or external mixer. Mixing may also be conducted in solution with an appropriate solvent. Useful solvents include organic solvents, preferably hydrocarbon solvents, and most preferably aliphatic solvents. Solid state mixing can occur at a temperature from about 100° to about 250° C., preferably from about 140° to about 230° C., more preferably from about 150° to about 200° C.

Once prepared, the soft gel compositions of this invention are thermoreversible and therefore may be employed to produce various articles via melt extruding or injection molding. This extrusion or molding preferably occurs at a temperature from about 160 to about 250° C. Advantageously, the soft gel compositions of this invention will flow at the extrusion or molding temperature, but do not flow at temperatures of less than about 100° C. Preferably, the gel compositions will not flow at temperatures of less than about 85° C., more preferably at temperatures of less than about 70° C., even more preferably at temperatures of less than about 60° C.

The gel composition and articles made therefrom exhibit excellent adhesion to metal and plastic substrates under the conditions of quick hot contact. The adhesion of the gel composition to metal and plastic surfaces eliminates the need for an adhesive to adhere the material to the substrate. In addition, the soft gel composition can be recycled and reused.

Because of its propensity to strongly adhere to metal and plastic surfaces, the gel composition can be utilized to prepare gaskets for disk drives, CD-ROM drives, DVD-ROM drives for microcomputers, gaskets for cellular telephones and the like. For example, a mounting plate for a disk drive assembly may include a substrate with a sealing gasket adhered thereto, with the sealing gasket being prepared from the gel composition of this invention.

The gel composition can be formed into a sealing gasket of any desired shape and easily attached to a base support plate via direct injection molding. These sealing gaskets have improved hardness, tensile strength, compression set, and excellent thermostability and flexibility. They also substantially prevent the introduction of gaseous and particulate contaminants into the disk drive housing.

Sealing gaskets made from the extended gel composition exhibit excellent adhesion to metal and plastic surfaces. In particular, the sealing gaskets show excellent adhesion to metal substrates such as, but not limited to, aluminum, iron, copper, and nickel surfaces. The gaskets also exhibit particularly good adhesion to nickel-coated metal surfaces such as, but not limited to, nickel-coated aluminum substrates.

The sealing gaskets made from of the inventive soft gel compositions are self-adhering or self-securing to metal and plastic surfaces under conditions of hot direct injection molding, and thereby eliminate the need for expensive machining of holes, interlocking recesses, or continuous grooves in the base support plate, which are used to secure the sealing gasket to the substrate. The sealing gasket material may be stripped from the surface of a base support plate and the soft gel composition recycled for further use.

In order to demonstrate the practice of the present invention, the following examples have been prepared and tested. The examples should not, however, be viewed as limiting the scope of the invention. The claims will serve to define the invention. Throughout this specification and claims, unless otherwise specifically stated, all percentages are by weight and are based on the total weight of the composition.

EXAMPLES

Example 1

Preparation of a Nylon-grafted EPR

Nylon 12 (Aldrich; Milwaukee, Wis.) and maleated EPR 1803 (Exxon Chemicals; Houston, Tex.) were introduced into a twin screw extruder at 2:1 weight ratio. The speed of the twin screw extruder was set to 26 RPM. The extruder had five temperature zones, which were set as follows: 180° C. for zone 1, 240° C. for zone 2, 240° C. for zone 3, 240° C. for zone 4, and 210° C. for zone 5. By using a 3 mm die, the extruding rate was adjusted to about 100 g per minute, and the retention time was about 10 minutes.

Example 2 (Comparative)

A mixture of a thermoplastic elastomer copolymer and extender was prepared. 52.5 g SEEPS, obtained under the name Septon 4077(Kuraray, Inc.; Tokyo, Japan), was mixed with 162.5 g paraffin oil (Idemitsu, Inc; Tokyo, Japan) with a spatula in an aluminum pan at room temperature. The resulting mixture was allowed to sit for about 30 minutes. The mixture was then charged into a 300 g capacity Brabender mixer equipped with a Banbury blade and nitrogen purging. The mixer was initially set to a temperature of 180° C. and a speed of 60 RPM. After 20 minutes of mixing, the mixture was removed from the mixer.

Example 3 (Comparative)

A mixture of Nylon 12, thermoplastic elastomer copolymer and extender was prepared. 15 g SEEPS (Septon) was mixed with 25 g paraffin oil using a spatula. This mixture was allowed to sit for 30 minutes.

10 g Nylon 12 was charged into a 50 g capacity Brabender mixer equipped with a roller blades and nitrogen purging. The mixer was initially set to a temperature of 180° C. and a mixing speed of 60 RPM. After 5 minutes of mixing, the SEEPS/paraffin oil mixture was added to the mixer. The nylon was mixed with the SEEPS/paraffin oil mixture for 15 minutes.

Example 4

13.125 g SEEPS was mixed with 21.875 g paraffin oil in an aluminum pan at room temperature using a spatula. The mixture of SEEPS and paraffin oil was allowed to sit for about 30 minutes.

A charge of 15 g of the Nylon 12-grafted EPR of Example 1 was added into a 50 g capacity Brabender mixer equipped with roller blades and nitrogen purging. The mixer was set to a temperature of about 180° C. and a mixing speed of 60 RPM. After 5 minutes of mixing the Nylon 12-grafted EPR, the SEEPS/paraffin oil mixture was added to the mixer and the Nylon 12-grafted EPR and the SEEPS/paraffin oil mixture was mixed for about 15 minutes.

Examples 5–9

The procedure of Example 4 was repeated, although the amount of the ingredients was different. The starting components for Example Nos. 5–9 are listed in Table 1 below.

TABLE I

| Example | Nylon-12 grafted EPR (grams) | SEEPS (grams) | Paraffin oil (grams) |
|---|---|---|---|
| 5 | 10 | 15 | 25 |
| 6 | 5 | 16.875 | 28.125 |
| 7 | 2.5 | 17.812 | 29.688 |
| 8 | 20 | 7.55 | 22.5 |
| 9 | 17.5 | 8.13 | 24.38 |

The products of Examples 2–9 were molded into sheets and cylinder buttons at about 160° C. Ring samples were cut from the sheets and were used for tensile measurements. The cylinder buttons were used for compression set measurements. The compression set was measured after 22 hours at 100° C.

The peel test was carried out on aluminum surfaces using standard test procedures. Specimens for the peel tests were prepared from sandwiching a compound between two aluminum sheets for 5 minutes at 160° C. and a pressure of about 34.5 MPa.

Air permeability tests were conducted on 1 mm thick sheets of the soft gel composition according to ASTM Standard D 1434, which measures the gas permeability characteristics of a film or sheet material. The air permeability tests were carried out at a temperature of about 30° C.

The results of the tensile measurements, compression set measurements, peel tests, and air permeability tests are shown in Table II below.

TABLE II

|  | 2 | 3 | 4 | 5 | 6 | 7 | 8 | 9 |
|---|---|---|---|---|---|---|---|---|
| Compression Set at 100° C. (%) | 73.7 | 89.8 | 65.3 | 51.3 | 53.2 | 63.4 | 76.1 | 77.4 |
| Tensile Strength at break (MPa) | 1.05 | 0.75 | 1.12 | 2 | 2.47 | 1.99 | 0.65 | 0.50 |
| Elongation at Break (%) | 1214 | 63.8 | 735 | 1112 | 1115 | 1014 | 948 | 690 |
| Shore A Hardness | 4 | 25 | 23 | 17 | 15 | 14 | 14 | 12 |
| Peel load on Al, (N over 1 m) Average | 65.32 | 289.13 | 411.54 | 356.63 | 282.28 | 164.96 | 247.28 | 237.44 |
| Air Permeability (cc/m$^2$/24 hours) | 526 | 318 | 310 | — | 332 | — | — | 286 |

The extended gel compositions of Example Nos. 2–9 were soft, thermoreversible gels.

Various modifications and alterations that do not depart from the scope and spirit of this invention will become apparent to those skilled in the art. This invention is not to be duly limited to the illustrative embodiments set forth herein.

What is claimed is:

1. A gel composition that is the combination of or reaction product of ingredients comprising:
   a polystyrene-b-poly(ethylene-ethylene/propylene)-b-polystyrene copolymer or hydrogenated polystyrene-isoprene/butadiene-styrene block copolymer;
   a nylon-grafted elastomer; and
   an extender.

2. The composition of claim 1, where the ingredients comprise from about 5 to about 80 parts by weight of said nylon-grafted elastomer per 100 parts by weight of said thermoplastic elastomer copolymer, and from about 5 to about 1,000 parts by weight of said extender per 100 parts by weight of said thermoplastic elastomer.

3. The composition of claim 1, where the ingredients comprise from about 20 to about 80 parts by weight of said nylon-grafted elastomer per 100 parts by weight of said thermoplastic elastomer copolymer, and from about 10 to about 800 parts by weight of said extender per 100 parts by weight of said thermoplastic elastomer.

4. The composition of claim 1, where said extender includes an oil or low molecular weight organic compound.

5. The composition of claim 4, where said oil includes a naphthenic, aromatic, paraffinic, phthalic, or silicone oil.

6. The composition of claim 1, where said nylon-grafted elastomer includes nylon-12.

7. The composition of claim 1, where said elastomer to which the nylon is grafted includes polybutadiene, poly(styrene-co-butadiene), polyisoprene, poly(styrene-co-butadiene-co-isoprene), poly(styrene-co-isoprene), copolymers of ethylene and an α-olefin and terpolymers of ethylene, an α-olefin, and diene monomers.

8. The composition of claim 7, where said elastomer includes a functional group deriving from unsaturated carboxylic acids or unsaturated anhydrides.

9. The composition of claim 7, where said elastomer includes maleated ethylene-propylene rubber.

10. The composition of claim 9, where said maleated ethylene-propylene rubber includes form about 0.01 to about 10% by weight substituents deriving from maleic acid.

11. The composition of claim 1, where said nylon-grafted elastomer includes the reaction product of a nylon and a maleated rubber.

12. The composition of claim 11, where said nylon-grafted elastomer includes the reaction product of nylon-12 and maleated ethylene-propylene rubber.

13. The composition of claim 1, where the gel composition is formed by mixing said thermoplastic elastomer copolymer, said nylon-grafted elastomer, and said extender in the solid state.

14. The composition of claim 1, where the ingredients comprise a nylon-12 grafted ethylene-propylene rubber, polystyrene-b-poly(ethylene-ethylene/propylene)-b-polystyrene, and a paraffin oil.

15. A gasket formed by melt extruding a composition that is the combination or reaction product of ingredients comprising:
   a polystyrene-b-poly(ethylene-ethylene/propylene)-b-polystyrene copolymer or hydrogenated polystyrene-isoprene/butadiene-styrene block copolymer
   a nylon-grafted elastomer; and an extender.

16. A disk drive assembly for computers comprising a gasket formed by melt extruding a composition that is the combination or reaction product of ingredients comprising:

a thermoplastic elastomer copolymer selected from the group consisting of styrene/butadiene rubber, styrene/isoprene rubber, styrene/isoprene/butadiene rubber, hydrogenated styrene-butadiene block copolymer, styrene-isoprene block copolymer, hydrogenated styrene-isoprene block copolymer, polystyrene-b-poly(ethylene/propylene), hydrogenated styrene-isoprene-styrene block copolymer, polystyrene-b-poly(ethylene/propylene)-b-polystyrene, styrene-ethylene/butylene-ethylene block copolymer, styrene-ethylene-styrene block copolymer, hydrogenated polystyrene-isoprene/butadiene-styrene block copolymer, also known as polystyrene-b-poly(ethylene-ethylene/propylene)-b-polystyrene, ethylene-ethylene/butylene block copolymer, ethylene-ethylene/butylene/styrene block copolymer, ethylene-ethylene/butylene-ethylene block copolymer, and mixtures thereof, a nylon-grafted elastomer; and an extender.

17. The disk drive assembly of claim 16, where the thermoplastic elastomer copolymer includes polystyrene-b-poly(ethylene-ethylene/propylene)-b-polystyrene or hydrogenated polystyrene-isoprene/butadiene-styrene block copolymer.

18. The disk drive assembly of claim 16, where the thermoplastic elastomer copolymer consists essentially of polystyrene-b-poly(ethylene-ethylene/propylene)-b-polystyrene or hydrogenated polystyrene-isoprene/butadiene-styrene block copolymer.

19. The disk drive assembly of claim 16, where the thermoplastic elastomer copolymer consists of polystyrene-b-poly(ethylene-ethylene/propylene)-b-polystyrene or hydrogenated polystyrene-isoprene/butadiene-styrene block copolymer.

* * * * *